(12) United States Patent
Williamson et al.

(10) Patent No.: US 8,656,682 B2
(45) Date of Patent: Feb. 25, 2014

(54) METHOD OF LAYING A FLOOR COVERING

(75) Inventors: Robert Williamson, Kent (GB); William Allen, Kent (GB); Michael Bollom, Kent (GB)

(73) Assignee: !OBAC Limited, Les Ruettes Bray (GG)

(*) Notice: Subject to any disclaimer, the term of this patent is extended or adjusted under 35 U.S.C. 154(b) by 203 days.

(21) Appl. No.: 11/631,954

(22) PCT Filed: Jul. 5, 2005

(86) PCT No.: PCT/GB2005/002644
§ 371 (c)(1),
(2), (4) Date: Oct. 11, 2007

(87) PCT Pub. No.: WO2006/008445
PCT Pub. Date: Jan. 26, 2006

(65) Prior Publication Data
US 2008/0190042 A1    Aug. 14, 2008

(30) Foreign Application Priority Data
Jul. 16, 2004    (GB) .................................. 0415892.9

(51) Int. Cl.
*E04B 1/00*    (2006.01)
*C09C 1/22*    (2006.01)

(52) U.S. Cl.
USPC ........ 52/746.1; 52/DIG. 4; 106/456; 427/190

(58) Field of Classification Search
USPC .......................................... 524/914; 106/502
See application file for complete search history.

(56) References Cited

U.S. PATENT DOCUMENTS

| | | | | |
|---|---|---|---|---|
| 3,081,186 A | * | 3/1963 | Burns | 106/235 |
| 3,341,996 A | * | 9/1967 | Jones et al. | 52/309.13 |
| 3,503,882 A | * | 3/1970 | Fitch | 252/62.54 |
| 4,184,304 A | * | 1/1980 | Merchant | 52/746.1 |
| 4,397,900 A | * | 8/1983 | Higgins | 428/95 |
| 4,405,674 A | * | 9/1983 | Kyle | 428/96 |
| 5,271,200 A | * | 12/1993 | Witt | 52/391 |
| 5,512,094 A | * | 4/1996 | Linton | 106/409 |
| 5,609,788 A | * | 3/1997 | Deetz | 252/62.54 |
| 5,721,302 A | * | 2/1998 | Wood et al. | 524/271 |
| 5,752,357 A | * | 5/1998 | Piller | 52/747.11 |
| 5,843,329 A | * | 12/1998 | Deetz | 252/62.54 |
| 6,235,105 B1 | * | 5/2001 | Hubbard et al. | 106/415 |
| 6,302,952 B1 | * | 10/2001 | Mobbs et al. | 106/456 |
| 6,620,464 B2 | * | 9/2003 | Sciandra | 427/547 |
| 6,808,807 B2 | * | 10/2004 | Anand et al. | 428/403 |
| 2003/0232130 A1 | * | 12/2003 | Lytle | 427/128 |
| 2006/0272281 A1 | * | 12/2006 | Marshall et al. | 52/796.1 |

FOREIGN PATENT DOCUMENTS

| | | | | |
|---|---|---|---|---|
| DE | 40 16 939 A1 | 11/1991 | | |
| DE | 196 19 012 | 11/1996 | | |
| FR | 1 426 252 A | 4/1966 | | |
| GB | 2 102 405 A | 2/1983 | | |
| GB | 2102405 A | * | 2/1983 | .............. C04B 31/02 |
| WO | WO 9617022 A1 | * | 6/1996 | .............. C09D 5/23 |

* cited by examiner

*Primary Examiner* — Brian Glessner
*Assistant Examiner* — Joseph J Sadlon
(74) *Attorney, Agent, or Firm* — Arent Fox LLP

(57) ABSTRACT

There is disclosed a method of laying a floor covering (14) on a floor (12). The method comprises the step of painting the floor to be covered (10) with a floor paint comprising ferromagnetic particles, and placing a magnetic floor covering (14) thereon.

16 Claims, 2 Drawing Sheets

METHOD OF LAYING A FLOOR COVERING

CROSS-REFERENCE TO RELATED APPLICATION

Figure 1:
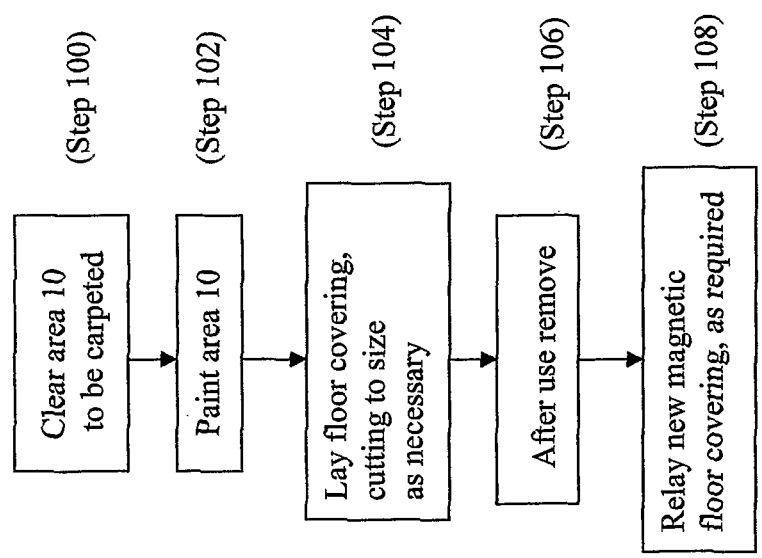

This application is a National Stage entry of International Application No. PCT/GB2005/002644, which claims priority to British Application No. GB0415892.9 filed Jul. 16, 2004, the entire specification claims and drawings of which are incorporated herewith by reference.

This invention relates to a method of laying a floor covering, and in particular to a method of laying a floor covering in the form of carpet tiles.

People staging exhibitions in exhibition halls have a long-standing problem of providing appropriate, but easily removable, floor coverings for individual exhibitions. Exhibition halls tend to have hard floors, such as cement floors, which are sealed to reduce dust. When a first exhibition is to be staged it may be necessary to lay a particular type of flooring, such as carpet, in a specific arrangement. When a subsequent exhibition is to be staged an entirely different flooring arrangement may be appropriate. The second exhibition may use carpet to zone different specific areas of the exhibition space or may require the bare floor surface. If normal carpet, in either roll or tile form, is used it has to be glued to the floor, especially given the heavy usage the carpet will face and the possible health and safety issues if the carpet wrinkles and causes an accident.

However, the repeated removal and replacement of carpets, glued to floors in exhibition centres, presents the problem that the glue, or tacifer adhesive, must also be removed and the floor cleaned prior to the next exhibition. As the glue has to be sufficiently strong to secure the carpet safely in the first place its removal from the floor, after the carpet is removed, is difficult, time consuming and very messy. The scale of this problem can be understood when one realises that major exhibition venues may replace carpets several times a week. The problem is compounded as some venues are considering banning the use of these tacifer adhesives on environmental grounds.

Of course, the problem is not limited to exhibition centres, as office buildings and other public and private spaces can suffer from the same problem. Also, floor coverings need not be glued to the floor and are in fact often secured with adhesive tape. However, the same problem exists that it is extremely difficult to remove the tape.

Although this has been a real commercial problem for many years no workable solution has been achieved and exhibition venues today persist in using glued carpets, normally carpet tiles, in the staging of exhibitions.

Accordingly, it is an object of the present invention to provide a method of carpeting floors, which ameliorates the aforementioned problems.

According to a first aspect of the present invention there is provided a method of laying a floor covering on a floor, comprising the steps of painting the floor to be covered with a metal-based paint, and placing a magnetic floor covering thereon.

Preferably, the magnetic floor covering used is carpet. Most preferably the carpet is formed from a plurality of carpet tiles.

The floor paints in accordance with the present invention provide a paint in which the ferromagnetic particles are substantially uniformly dispersed throughout whilst the paint is sufficiently fluid to be applied to a floor with a roller or the like without undue effort. Indeed, once the floor paint of the present invention is applied to floor, the layer of paint can provide a substantially uniformly dispersed quantity of ferromagnetic particles across the area of floor painted.

Preferably the floor paint composition is a non-water based paint. Such a non-water based paint may have base made from an alkyd resin or the like. Non-water based paints are preferred in order to prevent oxidation of the ferromagnetic particles and, thus, guard against a reduction of their ferromagnetic properties. Preferred non-water based paints include polyurethane alkyd resin based paints and epoxy-type based paints. Other non-water based paints may also be used however.

Alternatively, the floor paint composition may be a water based paint. In order to guard against oxidation of the ferromagnetic particles, the ferromagnetic particles may be made from stainless steel. Alternatively, the ferromagnetic particles could be coated in a water resilient coating prior to being mixed with the paint. Such a water based paint may have a base made from an acrylic resin, vinyl acetate copolymer or other latex resin types or the like.

In a preferred embodiment however, the ferromagnetic particles comprise at least one of the following types of particles, namely: iron particles; nickel particles; cobalt particles; or particles of alloys derived therefrom. Preferably iron particles are used.

Most preferably, the floor paint comprises iron filings and/or iron flakes. The iron filings/flakes may have an average diameter of substantially 10-100 microns.

Preferably the iron filings have an average diameter of substantially 30-60 microns, and even more preferably an average diameter of substantially 45 microns. A diameter of substantially 45 microns has been found by the Applicant to be the optimum diameter to ensure the filings remain substantially uniformly dispersed throughout the paint.

Although the floor paint of the present invention may be effective over a range of quantities of ferromagnetic particles to paint, the Applicant has identified an optimum range of such quantities. In one preferred embodiment of the present invention, the floor paint comprises a paint composition mixed with ferromagnetic particles, the particles being present in a volume of substantially 600 cm$^3$ per liter of paint. In a further preferred embodiment of the present invention, the floor paint comprises a paint composition mixed with ferromagnetic particles, the particles being present in a concentration of substantially 75% wt.

The floor paint of the present invention may also contain other constituents as part of the make up of the paint such as solvents, anti-skimming agents, opaquifying agents and the like.

Typically, the floor paint is applied to an area of floor with a roller or a brush, although due to speed and ease of application a roller is preferred. Alternatively, the floor paint could be applied to an area of floor with a spray mechanism, wherein said mechanism comprises a pump in communication at one end with a quantity of floor paint and at the other end with a nozzle for directing the spray.

Preferably, the floor paint is applied to an area of floor to produce a wet thickness layer of approximately 100-200 microns in depth. This will result in a dry thickness layer of approximately 60-120 microns in depth. The most preferred thickness' being a wet thickness layer of substantially 120 microns in depth and a dry thickness layer of substantially 80 microns in depth.

Ideally the floor paint is generally grey in colour. Since not all exhibitions requires a floor covering, a somewhat dark and neutral colour is advantageous since it tends not detract from the exhibits themselves. Additionally, a dark and neutral colour offers an ability to disguise marks left by the footfall of people walking thereon or of vehicles moving exhibits.

As already mentioned, since the floor paint of the present invention contain ferromagnetic particles, there is a danger that the ferromagnetic properties of the particles could be impaired should water be allowed to ingress into a layer of floor paint and oxidise the particles. In a preferred embodiment, the oxidation of the particles is substantially permanently avoided by the application of a sealer to the layer of floor paint.

In a preferred embodiment the sealer is a non-water based resin, such as a alkyd resin, maleic resin or the like. Alternatively, a range of water-based resins may be utilised, such as a water-based acrylic resin, vinyl acetate copolymer or other latex resin types or the like. The Applicant has found that water-based resins are acceptable insofar as they do not leach water contained therein such that said water is capable of ingress into the layer of floor paint. Furthermore, the use of water-based resins is generally preferred due to their environmental desirability in comparison to non-water based resins and the like.

The application of a sealer to the layer of floor paint provides the further advantage that a more commercially acceptable floor layer may be provided. Since the floor paint of the present invention comprises a substantially uniformly dispersed quantity of ferromagnetic particles, some of the particles will be present at the surface when dry. As such, the dry layer of floor paint may not be particularly smooth to the touch. The application of a sealer thereon will permit the introduction of a more commercially acceptable level of smoothness of floor once dry.

Preferably, the sealer is applied to an area of floor to produce a wet thickness layer of approximately 50-150 microns in depth. This will result in a dry thickness layer of approximately 5-25 microns in depth. The most preferred thickness' being a wet thickness layer of substantially 60 microns in depth and a dry thickness layer of substantially 15 microns in depth.

Ideally the sealer will be substantially translucent to permit the colour of the floor paint layer to be seen. Alternatively the sealer may be coloured in any colour desired such that the colour of the paint layer is obscured.

The sealer may also contain other constituents as part of its make up such as water, solvents, defoamers, thickeners and the like.

Clearly, the paint for use in the aforementioned method of floor covering must be used in conjunction with a magnetic floor covering.

An industrial problem may arise if magnetic sheeting is used to back the floor covering in that known magnetic sheeting could not be successfully adhered to the back of, for example, a carpet or carpet tile during an industrial carpet manufacturing process. The intricacy of manufacturing a carpet and backing it with commercially available magnetic sheeting would not be commercially viable.

Preferably, the floor covering is a composite covering containing magnetic components. Most preferably, the floor covering has an integral planar portion in which the majority of the magnetic material is contained.

An addition problem may arise, if the magnetism of the floor paint and carpet covering is very high there is a distinct possibility that the magnetic field created thereby may interfere with computers and other electronic equipment, which is sensitive to magnetic fields. For these reasons, the use of a floor paint of the present invention with magnetic tiles is considered by the Applicants to be a novel approach, leading away from the trend in the industry of using adhesives.

Indeed the Applicant has identified that the floor paint of the present invention when applied to an area of floor is the optimum for ensuring that, on the one hand, there will be a sufficient magnetic attraction between the magnetic floor covering and the paint and, on the other hand, that there will be a substantially uniform distribution of ferromagnetic particles throughout the layer of paint such that each piece of floor covering is attracted to the floor uniformly. A uniform attraction is of particular importance from a health and safety point of view to ensure that a part of the floor covering does not lift away from the paint to give rise to the possibility of people tripping over.

Furthermore, exhibition halls routinely employ people whilst a conference or exhibition is in progress to walk around the hall to monitor the floor and ensure that the floor covering has not lifted away. It is envisaged that the combination of the floor paint of the present invention together a floor covering of the present invention could eliminate the need to employ people for such monitoring roles.

Figure 2:
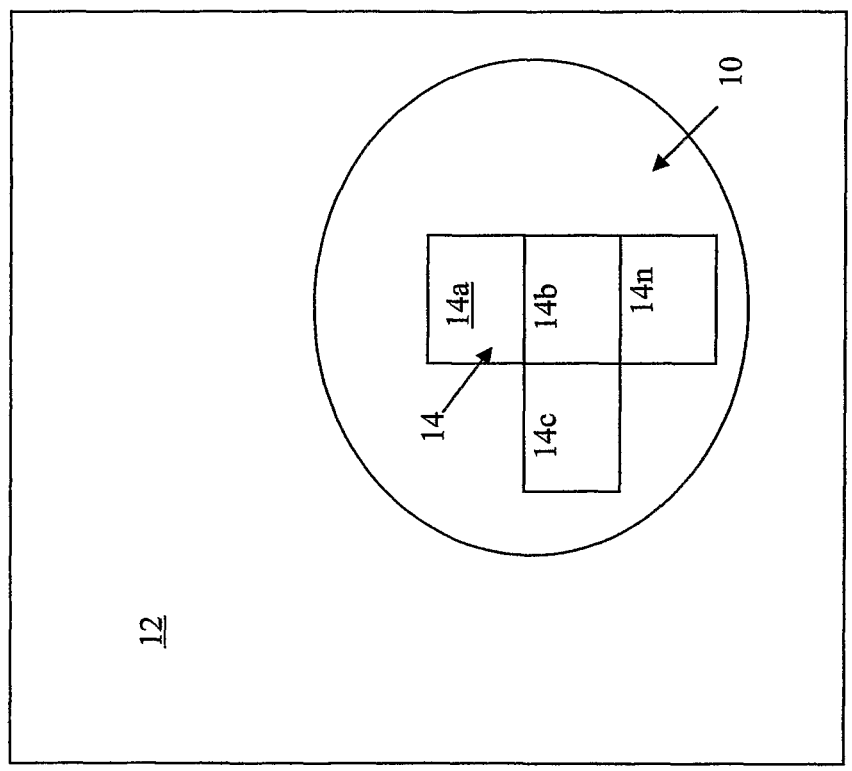

Embodiments of the present invention will now be described, by way of example, with reference to the accompanying drawings, in which:

FIG. 1 is a flow diagram of a method of covering a floor in accordance with the present invention; and FIG. 2 is a schematic representation of a floor of an exhibition centre being carpeted by the method of FIG. 1.

With reference to FIGS. 1 and 2 an area 10 of a floor 12 is covered with a floor covering 14, in the form of carpet tiles 14a, 14b . . . 14n, as follows.

The floor area 10 to be covered, in this embodiment carpeted, is cleared (step 100). The area to be carpeted is painted with a magnetic floor paint, which will be described more fully below (step 102). The area is then carpeted by laying a plurality of magnetic carpet tiles 14a, 14b . . . 14n, which will also be described more fully below, onto the painted floor area 10 (step 104).

The carpet can then be removed, simply and easily, by peeling off the magnetic carpet tiles (step 106). Thereafter, a second carpet arrangement can be laid onto the floor 12, over the same area 10 or a different area (not shown) (step 108). Steps 104 to 108 can be repeated as often as is necessary during the lifetime of an exhibition centre, with periodic re-painting of the floor to ensure a high quality "adhesion" between the floor coverings used and the paint.

The floor covering mentioned above is a standard floor tile with magnetic stripes attached to the rear surface thereof. However, in an alternative embodiment the magnetic floor covering is a composite floor covering in which a magnetic material is incorporated during manufacture. In this embodiment the covering has an integral planar portion in which the majority of the magnetic material is contained. This composite structure is preferable both because it results in magnetic particles being distributed evenly throughout the carpet tiles. In that way the magnetic material cannot be accidentally cut off when a tile is being cut to size. Also, it avoids the problem of adhering a magnetic back sheet to the tile.

The floor paint mentioned above is a grey, non-water based floor paint, although other colours can be manufactured. The floor paint can contain between 500-700 $cm^3$ of Iron filings per litre of pre-mixed floor paint. In the present embodiment the floor paint contains approximately 600 $cm^3$ of iron filings per litre of pre-mixed floor paint. The filings are manufactured such that they generally have a diameter of substantially 45 microns. The particles are added to the paint whilst the paint is under constant agitation to assist in the uniform distribution of the particles throughout the paint.

The paint is applied to a floor via a roller. Although the thickness of the paint layer may be varied depending upon the specific requirements, a paint layer having a wet thickness of substantially 120 microns in depth and a dry thickness of substantially 80 microns in depth has found to work well.

Once the floor paint is dry, a layer of sealer is applied thereover to provide a more commercially acceptable finish. The sealer is a self-crosslinking acrylic resin.

The sealer is also applied to the floor with a roller. Generally the application of the sealer to produce a wet thickness of substantially 60 microns in depth and a dry thickness of substantially 15 microns in depth has been found to work well.

Modifications may be incorporated without departing from the scope of the present invention. For example, floor coverings other than carpet, for example linoleum may be utilised.

The invention claimed is:

1. A method of laying a floor covering on a floor, comprising the steps of:
   painting the floor to be covered with a floor paint comprising ferromagnetic particles, and
   placing a magnetic floor covering thereon; wherein
   the ferromagnetic particles are coated with a water resilient coating before being mixed with the floor paint; and
   the ferromagnetic particles have an average diameter of substantially 45 microns.

2. A method as claimed in claim 1, wherein the magnetic floor covering used is carpet.

3. A method as claimed in claim 2, wherein the carpet is formed from a plurality of carpet tiles.

4. A method as claimed in claim 3, wherein the magnetic floor covering used is a composite floor covering in which a magnetic material is incorporated during manufacture.

5. A method as claimed in claim 4, wherein the floor paint comprises a paint composition mixed with ferromagnetic particles, the particles being present in a volume of substantially 500-700 $cm^3$ per liter of paint.

6. A method as claimed in claim 5, wherein the floor paint comprises 600 $cm^3$ of ferromagnetic particles per liter of paint.

7. A method as claimed in any of claim 1, wherein the floor paint comprises a paint composition mixed with ferromagnetic particles, the particles being present in a concentration of substantially 70-80% wt.

8. A method as claimed in claim 7, wherein the ferromagnetic particles are substantially uniformly dispersed throughout.

9. A method as claimed in claim 8, wherein the paint composition is a non-water based paint.

10. A method as claimed in claim 7, wherein the ferromagnetic particles comprise at least one of the following types of particles, namely: iron particles; nickel particles; cobalt particles; or particles of alloys derived therefrom.

11. A method as claimed in claim 10 wherein the iron particles have an average diameter of substantially 10-100 microns.

12. A method as claimed in claim 7, wherein the floor paint comprises a concentration of substantially 75% wt. of ferromagnetic particles.

13. A method as claimed in claim 12, wherein a sealer is provided over the painted floor once the paint has dried.

14. A method as claimed in claim 13, wherein the sealer is a water-based resin.

15. A method as claimed in any of claim 1, wherein the paint composition is a water-based paint.

16. The method of laying a floor covering of claim 1, wherein the ferromagnetic particles comprise at least one of iron filings and iron flakes.

* * * * *